United States Patent Office 3,423,388
Patented Jan. 21, 1969

3,423,388
PREPARATION OF COLORLESS
1,4-CIS-POLYBUTADIENE
Gottfried Pampus, Leverkusen, Josef Witte, Cologne-Stammheim, and Nikolaus Schon, Leverkusen, Germany, assignors to Farbenfabriken Bayer Aktiengesellschaft, Leverkusen, Germany, a corporation of Germany
No Drawing. Filed Nov. 13, 1963, Ser. No. 323,265
U.S. Cl. 260—94.7                                9 Claims
Int. Cl. C08d 5/02, 3/08

This invention relates to a refining process for rubbery like polydienes. In one aspect the invention relates to a novel process for refining a diene-polymer prepared by polymerizing a conjugated diene in an organic solution, wherein colorless polybutadienes are obtained.

It is known that polymer solutions which are dark in color are formed by the polymerization of butadiene with organometallic mixed catalysts in solution. The polybutadiene can only be isolated in a colorless form from such solutions with difficulty on an industrial scale.

Various processes are known for working up polymer solutions and these are used on a large industrial scale. If the polymer is dissolved in a solvent which is immiscible with water, the solvent can with advantage be removed by steam distillation and the polymer can be obtained in the form of crumbs. For example, by introducing a solution of chlorinated rubber in carbon tetrachloride into hot water, the solvent can be distilled off in admixture with water, leaving a suspension of solvent-free chlorinated rubber in water, which can satisfactorily be filtered. Similar working up processes have also been described for the isolation of polyolefines which are produced in organic solvents with the aid of organometallic mixed catalysts or chromium oxide catalysts, as is described for example, in British patent specification No. 856,326. Finally, the separation of elastomers from solutions in aliphatic or aromatic substances by steam distillation is also known and is described, for example, in Belgian Patents 602,010 and 602,119 and in U.S. Patent 2,905,658. The general procedure for this working-up method is that substances that destroy the catalysts (stopping agents) and stabilizers that protect the polymer against degradation or crosslinking are added to the polymer solution. Residual monomer and, optionally, a part of the solvent are removed by heating and the polymer solutions thus pretreated are introduced, while stirring, into hot water which contains small quantities of wetting agents. As a result, a mixture of solvent and water is distilled off and the remaining polymer is obtained in the form of crumbs. Following this procedure with 1,4-cis-polybutadiene solutions produced with titanium-containing organometallic mixed catalysts in aromatic solvents, products having a strong brown color are obtained after the crumbs have been dried.

Although some of the 1,4-cis-polybutadiene is used, mixed with carbon black, for automobile tires, it is nevertheless of great industrial importance to obtain colorless polybutadiene which can be used for the production of white or light-colored rubber articles.

It is true that polybutadiene which has only a faint coloring, can be precipitated from the solutions containing mixed catalysts with low aliphatic alcohols; this process, however, is very uneconomical and also presents technical difficulties, so that it cannot be used on a large industrial scale.

It has now been discovered that 1,4-cis-polybutadiene solutions which are produced with titanium-containing mixed catalysts in aromatic solvents can be worked up by steam distillation to give colorless polybutadiene by destroying the catalyst with 0.3 to 5%, and advantageously 1 to 3%, of a difficulty volatile carboxylic acid which is soluble in aromatic solvents and which contains at least 10 carbon atoms, and 0.5 to 2% of a non-discoloring stabiliser which is a mononuclear or polynuclear phenol and 0.001 to 2%, and advantageously 0.1 to 0.5%, of a complexing agent, and the polybutadiene solution thus pretreated is introduced, while stirring vigorously, into hot water, containing 0.0005-0.05, and advantageously 0.001-0.01%, of a weakly anionic or a non-ionic wetting agent, the temperature of the water being above or equal to the boiling point of the solvent-water azeotrope under the ambient pressure. If all these conditions are followed, colorless polybutadiene is produced. The catalysts used in the polymerization stage of the process are known per se. Organometals and titanium compounds are used in admixture with other compounds. Particularly effective are mixtures of lithium-aluminium alkyl compound with a titaniumtetrahalogenide and a halogen or a halogen containing organic compound, especially iodine or a iodine alkyl.

The carboxylic acids which are introduced should not form any colored substances with the catalyst components, mainly the titanium compounds. Long-chain fatty acids, such as stearic acid, palmitic acid and coconut fatty acid, can be used for the process according to the invention but polymers containing carboxyl groups and obtained from maleic acid or maleic acid semiester copolymers with isobutylene, styrene or diolefines, such as butadiene or isoprene, can also be used. In this connection, the following copolymers are to be mentioned by way of example: copolymers of styrene and maleic acid-2-ethyl-hexyl semiester or maleic acid-dodecyl semiester and copolymers or butadiene and maleic acid butyl semiester or 2-ethyl-hexyl semiester. The carboxylic acids must be difficultly volatile so that they do not distil over with the solvent-water mixture, since the solvent is to be used again for the polymerization without any uneconomic purification process. The carboxylic acids are used in quantities of 0.3 to 5%, advantageously 1 to 3%. The complexing agents used are those which are effective in the pH range from 7 to 10, so that the carboxylic acids added to the polymer solution do not pass over completely into the water phase. The complexing agents mainly employed are salts of boric acid or phosphoric acids, for example borax or orthophosphates pyrophosphates or metaphosphates. Difficultly volatile aliphatic amines which are soluble in toluene and water are also used. These amines must be so difficultly volatile that they do not distil over during the removal of the residual monomer, which is to be returned without tedious purification operations to the polymerization process; a boiling point of at least 150° C. at normal pressure is necessary for this. Moreover, the amines must be readily soluble in aromatic substances, such as benzene or toluene. No salts which are insoluble in aromatic substances should be formed with the aforementioned carboxylic acids, since otherwise there would be non-uniform distribution in the polybutadiene solution and incomplete destruction of the mixed catalyst. The amines must, moreover, be completely soluble in water, so that when the solvent is driven off, it is free from amine and flows back to the polymerization process after having undergone a simple drying operation. Polyglycol ether amines have the required properties, particularly reaction products of low aliphatic amines or alkanolamines with 5 to 10 mols of ethylene oxide per mol of amine. The following polyglycol ether amines are to be indicated by way of example:

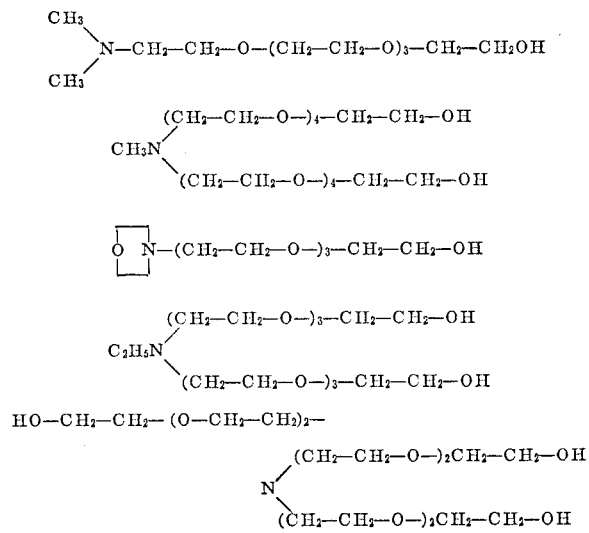

Non-discoloring mononuclear or polynuclear phenols, in quantities from 0.5 to 2%, are used as stabilizers. The following are given by way of example (X=tert.-butyl group, P=ester of phosphorous acid);

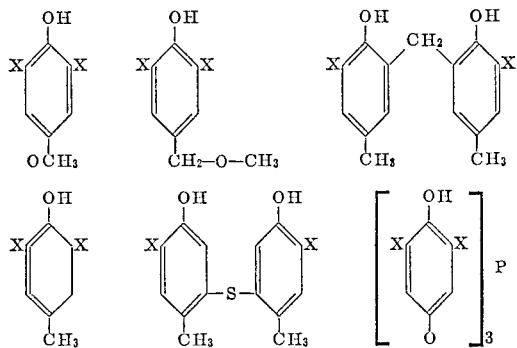

The sequence in which the substances are added is not critical. Either the amine or the stabilizer or even the carboxylic acid may be added first.

After adding these substances, the dark color of the organometallic mixed catalysts disappears. The colorless polymer solution is now introduced into water which contains 0.0005 to 0.05%, advantageously 0.001 to 0.01%, of a wetting agent. According to the invention, weakly anionic or non-ionic wetting agents are used, such as polymeric carboxylic acids, e.g. copolymers of isobutylene or styrene with methacrylic or acrylic acid, maleic acid or maleic acid semiesters or polyglycol ethers of higher alcohols or alkyl phenols.

Example 1

1000 parts by volume of dry toluene are placed in a stirrer-type autoclave with exclusion of air and moisture. 0.189 part by weight of titanium tetrachloride, 0.508 part by weight of iodine and 0.785 part by weight of lithium-aluminium butyl triisobutyl and 120 parts by weight of butadiene are then added. Polymerization starts immediately and the reaction temperature is kept for 4 hours at 20° C. A solution of 3 parts by weight of a copolymer of equimolar quantities of butadiene and maleic acid isohexyl semiester and 1 part by weight of 2,6-di-tert.-butyl-4-methoxyphenol in 50 parts by volume of toluene, is then added while stirring vigorously. After standing for several hours at room temperature, the pale yellowish polybutadiene solution is slowly run while stirring into hot water which has a temperature of 97° C. and which contains 0.001% of the sodium salt of a copolymerizate of isobutene and methacrylic acid and 0.005% of borax. A mixture of toluene and water then distils off. The polybutadiene freed from the solvent is dried at 50 to 70° C. in vacuo. The dried material has only a very faintly yellowish coloring.

Example 2

A solution of 2.2 parts by weight of stearic acid and 1.35 parts by weight of 2,2'-methylene-bis-4,4'-methyl-6, 6'-tert.-butyl-phenol in 100 parts by weight of toluene is added while stirring vigorously to a polybutadiene solution prepared as in Example 1. The faintly yellowish solution resulting is run slowly and while stirring, at a temperature of 95 to 98° C., into 10,000 parts by volume of water containing 0.001% of the same wetting agent as in Example 1 and 0.005% of borax. While the temperature of the water is kept above 95° C., a toluene-water mixture distills off. The polybutadiene is obtained in the form of crumb and is dried at 50 to 70° C. in vacuo. After having been separated by pressing, the dry polybutadiene is a fairly clear substance with a slight yellowish tinge.

Example 3

(a) To a polybutadiene solution prepared as in Example 1, there were added 2.0 parts by weight of a copolymer of maleic acid-2-ethyl-hexyl semiester (65%) and styrene (35%) and also 0.9 part by weight of 2,6-di-tert.-butyl-4-methoxyphenol, both substances being dissolved in a little toluene. Stirring was continued for a time after the disappearance of the catalyst coloring. In order to remove the solvent, the polymer solution was stirred into hot water as in Example 1, containing 0.001% of the same wetting agent as in Example 1 and 0.005% of borax. The vacuum-dried polybutadiene crumbs had only a faint yellowish coloring.

(b) Polybutadiene of the same quality was obtained by adding to the polymer solution, following the polymerisation, a solution of 2 parts by weight of a copolymer of maleic acid dodecyl semiester and butadiene (molar ratio 1:1) and 1 part by weight of tri-2,6-di-tert.-butyl hydroquinone phosphite in 50 parts by weight of toluene. The further treatment was as in Example 1.

Example 4

In the absence of air and moisture, 1000 parts by volume of dry toluene were placed in a stirrer-type autoclave. There were then added 0.189 part by weight of titanium tetrachloride, 0.508 part by weight of iodine, 0.785 part by weight of lithium-aluminum butyl triisobutyl and 120 parts by weight of butadiene. Polymerisation started immediately and the reaction temperature was maintained for 4 hours at 20° C. After completion of polymerisation, a solution of 1.5 parts by weight of stearic acid in 50 parts by volume of toluene and thereafter a solution of 0.5 part by weight of a reaction product of dimethylamino ethanol with 5 mols of ethylene oxide in 20 ml. of toluene are added and stirred vigorously. Finally, 1.25 parts by weight of 2,6-di-tert.-butyl-4-methyl-phenol, dissolved in 20 ml. of toluene, are incorporated by stirring. The colorless polybutadiene solution is now slowly introduced, while stirring vigorously at 97 to 98° C., into 10,000 parts by volume of water containing 0.1 part by weight of the same wetting agent as in Example 1. The toluene-free polybutadiene forming as crumbs is dried at 80° C. After 12 hours, 120 parts by weight of a colorless polybutadiene are obtained.

Example 5

A polybutadiene solution prepared as described in Example 1 is thoroughly mixed with a solution of 2 parts by weight of a copolymer of equimolar quantities of butadiene and maleic acid 2-ethyl-hexyl semiester and 0.3 part by weight of a reaction product of dimethylamine and 7 mols of ethylene oxide in 50 ml. of toluene. The organometallic mixed catalyst is thereby destroyed and a colorless polybutadiene solution is formed. This is stirred for stabilisation purposes with a solution of 1.0 part by weight of 2,2'-dihydroxy-3,3'-di-tert.-butyl-5,5'-dimethyldiphenyl-methane in 30 parts by weight of toluene. This pre-treated polybutadiene solution is slowly introduced while stirring vigorously into 10,000 parts by volume of water at a temperature of 98° C. The toluene-free polybutadiene crumbs which are formed are filtered off, washed and dried at 80° C. The dry material is pressed into a colorless clear block.

Example 6

In the absence of oxygen and moisture, 0.44 part by weight of lithium-aluminum-n-butyl triisobutyl, 0.228 part by weight of iodine and 0.114 part by weight of titanium tetrachloride is added to a mixture of 900 parts by weight of toluene and 100 parts by weight of butadiene at 15° C. The reaction temperature is so controlled that 30° C. is reached after 2 hours. The polymerization is complete after a total of 4 hours. 1.8 parts by weight of resinic acid (disproportionated abietic acid), 0.3 part by weight of a polyglycol ether amine obtained from 1 mol of dimethyl-amine and 7 mols of ethylene oxide and 1.0 part by weight of 2,6-di-tert.-butyl-4-methylphenol, dissolved in 40 parts of toluene are added to the polymer solution. After thorough mixing, the clear toluene solution is slowly introduced, while stirring vigorously at a temperature of 98° C., into 7000 parts by weight of water containing 0.07 part by weight of a copolymer of isobutylene and maleic acid. A toluene-water mixture is distilled off leaving a dispersion of polybutadiene crumbs in water. The white rubber crumbs with a uniform size of 3–4 mm. are dried and pressed to form a colorless clear block. Yield: 97 parts by weight.

This example was repeated in similar manner, using the following polyglycol ether amines:

1 mol of morpholine+4 mols of ethylene oxide (0.2%);

1 mol of methylamine+10 mols of ethylene oxide (0.2%);

1 mol of ethylamine+8 mols of ethylene oxide (0.2%).

In each instance colorless, clear polybutadiene was obtained.

The refined rubbery polymers obtained in accordance with this invention have a more extensive utility in application as natural and synthetic rubbers. They can be used in the plastic field and are particularly useful in applications requiring a colorless rubbery-like polymer.

What we claim is:

1. In the process of recovering 1,4-cis-polybutadiene from a mixture prepared by polymerizing 1,3-butadiene in the presence of a titanium-containing catalyst in an aromatic hydrocarbon diluent, by steam distilling off aromatic hydrocarbon diluent-water vapor mixture, the improved method of obtaining colorless 1,4-cis-polybutadiene which comprises the steps of forming an intimate mixture consisting of the aforesaid mixture containing 1,4-cis-polybutadiene, a carboxylic acid having at least 10 carbon atoms which is soluble in said aromatic hydrocarbon diluent and which boils at a temperature above the vapor temperature of said aromatic hydrocarbon diluent-water vapor mixture, a non-discoloring sterically-hindered phenolic stabilizer and a polyglycol ether amine soluble in water and said aromatic hydrocarbon diluent which has a boiling point above the vapor temperature of the hydrocarbon diluent-water vapor mixture; introducing resulting mixture after color disappearance into hot water containing a weakly anionic or non-ionic wetting agent, the temperature of said water being at least equal to the vapor temperature of the aromatic hydrocarbon diluent-water vapor mixture under the ambient pressure conditions to distill off aromatic hydrocarbon diluent-water vapor mixture and recovering colorles 1,4-cis-polybutadiene.

2. The process of claim 1 wherein said steam distillation is carried out at a temperature of about 95 to about 100° C.

3. The process of claim 1 wherein the amount of said carboxylic acid compound in said intimate mixture is from 0.3 to 5% by weight thereof, the amount of said sterically-hindered phenolic stabilizer present in said intimate mixture is from 0.5 to 2% by weight thereof and the amount of said amine in said intimate mixture is from 0.5 to 2% by weight thereof.

4. The process of claim 1 wherein the said water wetting agent is present in an amount of from 0.0005 to 0.05% by weight, based on the weight of 1,4-cis-polybutadiene present.

5. The process of claim 1 wherein said carboxylic acid compound is selected from the group consisting of stearic acid, coconut fatty acid, copolymers of butadiene and a maleic acid semiester and copolymers of styrene and a maleic acid semiester.

6. The process of claim 1 wherein said amine is the reaction product of 1 mol of dimethylamino ethanol and 5 mols of ethylene oxide.

7. The process of claim 1 wherein said amine is the reaction product of 1 mol of dimethylamine and 7 mols of ethylene oxide.

8. The process of claim 1 wherein said sterically-hindered phenolic stabilizer is selected from the group consisting of 2,6-di-tert.-butyl-p-cresol, 2,6-di-tert.-butyl-4-methoxyphenol and 2,2'-methylene-bis-4,4'-methyl-6,6'-tert.-butyl-phenol.

9. The process of claim 1 wherein said wetting agent is selected from the group consisting of polyglycol ethers of ethylene oxide and oleyl alcohol, copolymers of isobutylene and methacrylic acid and copolymers of styrene and maleic acid.

References Cited

UNITED STATES PATENTS

| | | | |
|---|---|---|---|
| 2,798,062 | 7/1957 | Contois | 260—78.5 |
| 2,933,468 | 4/1960 | Aldridge et al. | 260—78.4 |
| 2,953,554 | 9/1960 | Miller et al. | 260—94.7 |
| 3,125,560 | 3/1964 | Brewster | 260—96 |
| 3,177,166 | 4/1965 | Gregory et al. | 260—94.7 |
| 3,190,868 | 6/1965 | Mitacek et al. | 260—94.7 |

FOREIGN PATENTS 568,154 12/1958 Canada.
619,748 5/1961 Canada.

JOSEPH L. SCHOFER, *Primary Examiner.*

W. F. HAMROCK, *Assistant Examiner.*

U.S. Cl. X.R.

260—96, 94.3, 94.2, 78.4, 78.5, 45.95